PULSE TIMING CIRCUIT

Filed Dec. 28, 1945 2 Sheets-Sheet 1

Inventor:
Alfred F. Bischoff,
by Merton D. Moore
His Attorney.

July 17, 1951 | A. F. BISCHOFF | 2,561,172

PULSE TIMING CIRCUIT

Filed Dec. 28, 1945 | 2 Sheets-Sheet 2

Inventor:
Alfred F. Bischoff,
by Merton D. Moore
His Attorney.

Patented July 17, 1951 2,561,172

UNITED STATES PATENT OFFICE 2,561,172

PULSE TIMING CIRCUIT

Alfred F. Bischoff, Ballston Spa, N. Y., assignor to General Electric Company, a corporation of New York Application December 28, 1945, Serial No. 637,659

10 Claims. (Cl. 250—27)

My invention relates to pulse timing devices and particularly to a pulse timing device comprising a pulse generator and a plurality of frequency dividing stages with interrelated pedestal generating circuits and time delay multivibrators.

An object of the invention is to provide a device capable of producing a second pulse at a predetermined adjustable time interval after a first pulse in which the interval is determinable within close limits.

Another object of the invention is to provide a device for generating a repeating pulse at a predetermined repetition rate and a second pulse delayed by a predetermined time after each of the repeating pulses, wherein the delay time is accurately controlled and readily adjustable.

Figure 1:
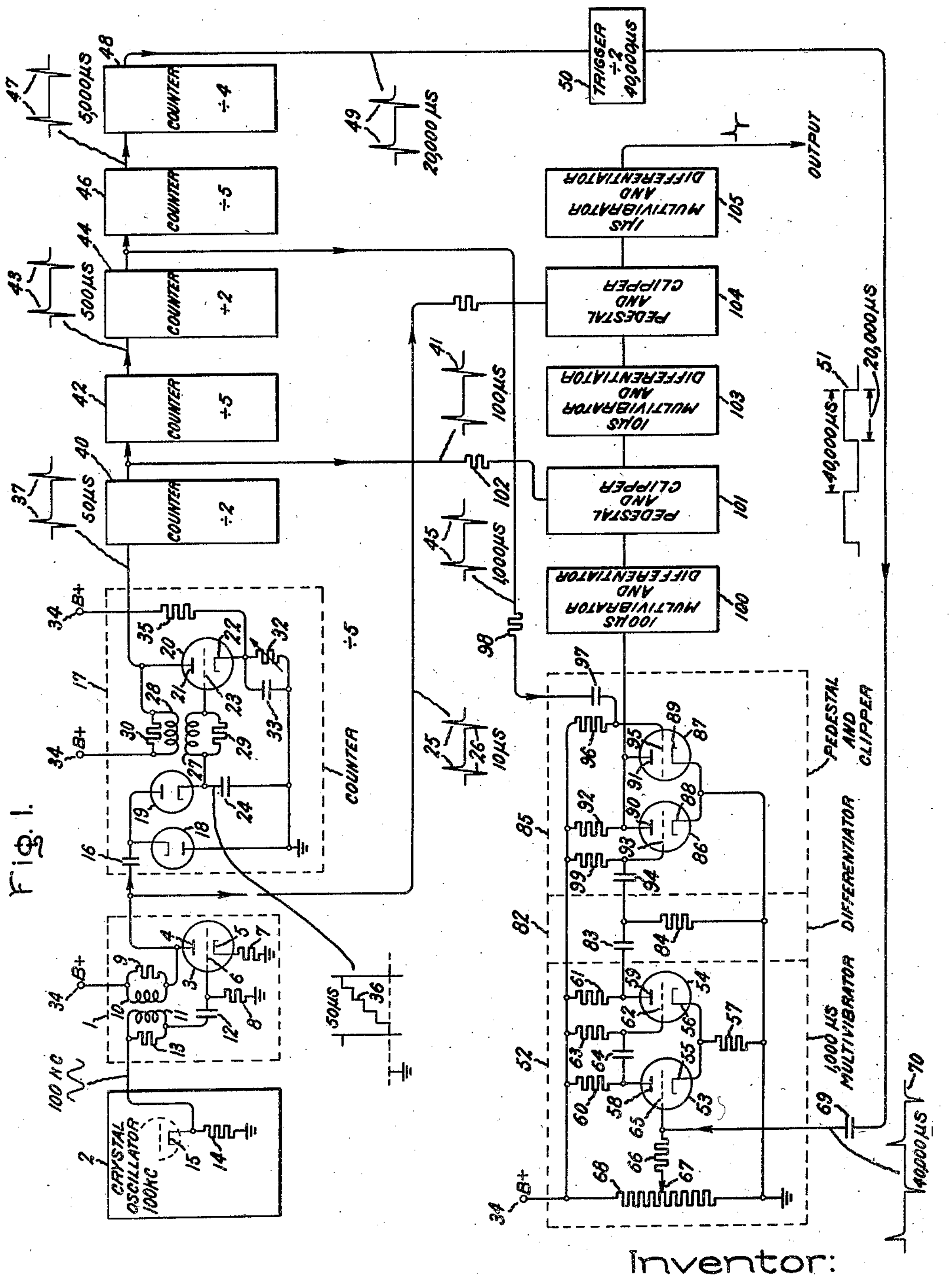

Referring now to the drawings, I have shown in Fig. 1, partially in block form, a pulse timing circuit embodying my invention. Briefly, this circuit comprises a pulse generator followed by a plurality of frequency dividing stages terminating in a trigger circuit, the output of which provides trigger pulses at a predetermined repetition rate, each pulse establishing an arbitrarily selected zero time. Synchronized from the trigger pulses, there are provided a plurality of pedestal generating circuits connected in cascade and associated with selected points in the series of frequency dividing stages to provide a final output pulse delayed with respect to the trigger pulse by a predetermined time selectable and measurable in microseconds in accordance with the decimal system, the total delay being the sum of the individual delays provided by each of the pedestal generating circuits.

Figure 2:
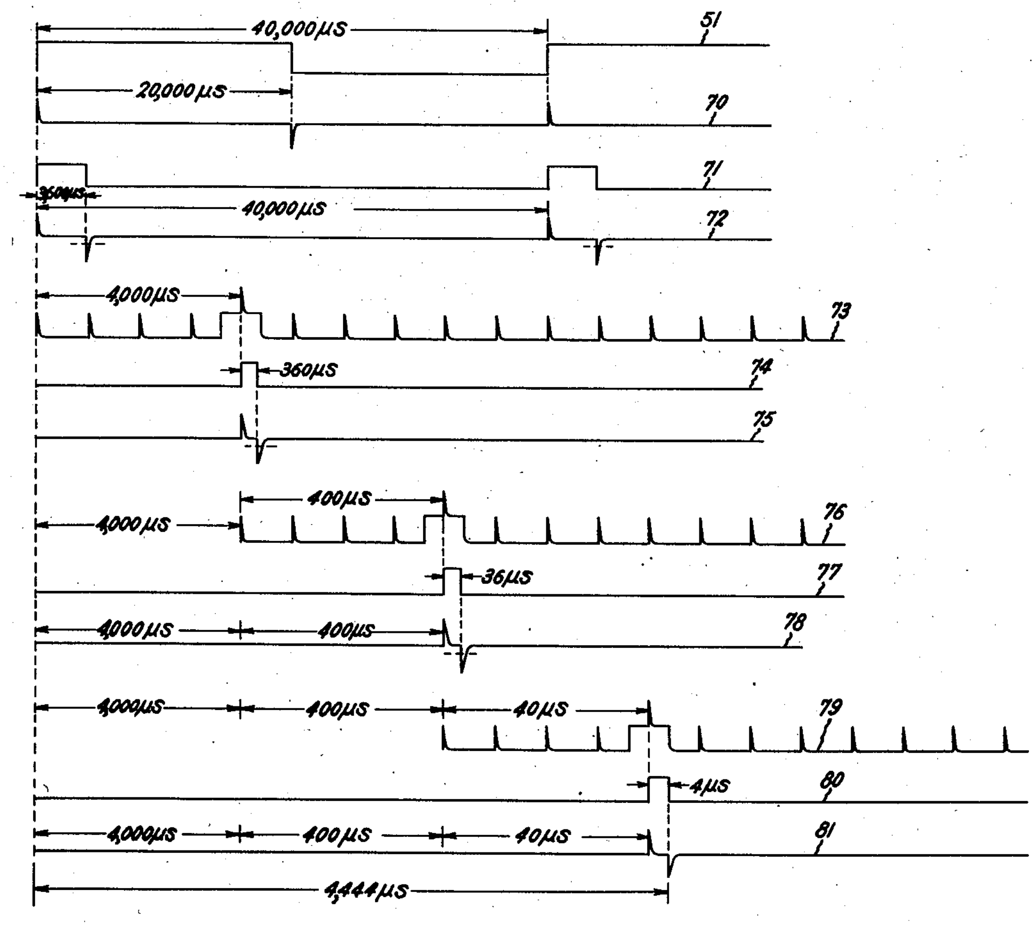

Fig. 2 is graphical presentation showing the sequence of wave forms present in the operative apparatus.

In describing the embodiment of the invention shown in the drawings, exemplary times, wave shapes and sequences will be used for the purpose of better illustrating the invention. It will be understood, however, that my invention is in no way limited in its application to the particular repetition rate, pulse shapes and timing chosen by way of illustration.

In Fig. 1 is shown a pulse generator 1 arranged to be synchronized from a substantially constant frequency crystal oscillator 2. The pulse generator 1 may be of any suitable type, but by way of illustration I have shown a blocking oscillator comprising an electron discharge device 3 having an anode 4, a cathode 5, and a control electrode 6. The cathode and control electrode are connected to ground through resistors 7 and 8, respectively, and the anode is connected to a suitable source of unidirectional positive potential 34 through a resistor 9. Across the resistor 9, there is connected a primary winding 10 of a grid coupling transformer, the secondary winding 11 of which has one terminal connected through a timing capacitor 12 to the control electrode 6 and the other terminal is connected to the source of synchronizing oscillations 2, the winding 11 being shunted by resistor 13. It will be understood that, in operation, the blocking oscillator 1 will, independently of any synchronization from the oscillator 2, generate pulses at a repetition rate determined by the time constant primarily established by the capacitor 12 and resistor 8, but influenced by a portion of the circuit of the crystal oscillator 2, such as a resistor 14 shown connected from ground to cathode 15 of an electron tube of the oscillator, by transformer secondary winding 11, shunted by resistor 13, and transformer primary winding 10, shunted by resistor 9.

By way of illustration, it will be assumed that the blocking oscillator 1 has a natural repetition rate of 95,000 pulses per second so that a pulse is generated approximately every 10.52 microseconds. Preferably, the synchronizing sine wave oscillator 2 is a 100-kilocycle oscillator so that the blocking oscillator 1 can be triggered slightly before its natural firing time by the crystal oscillator 2 and thus synchronized, or accurately timed, by the high stability oscillator 2.

The 10-microsecond pulses generated in the blocking oscillator 1 are supplied through a coupling capacitor 16 to a pulse counting circuit 17 which is adjusted by resistor 32 to supply one output pulse upon the occurrence of every fifth input pulse. This circuit is identified upon the drawing as a ÷5 counter.

The pulse counter 17 comprises a pair of reversely connected diode rectifiers 18 and 19 and an electron discharge device 20 having an anode 21, a cathode 22, and a control electrode 23. The anode of the discharge device 19 is connected through the coupling capacitor 16 to the anode 4 of the blocking oscillator tube 3, and the cathode of the discharge device 19 is connected through a capacitor 24 to ground. The diode 18 has its anode connected directly to ground and its cathode connected to the anode of the diode 19. Thus, in operation, positive half waves, such as indicated at 25 in Fig. 1, from the blocking oscillator 1 are passed through the diode 19 to charge the capacitor 24, while negative half waves, as indicated by 26, from the blocking oscillator 1 are by-passed directly to ground through the diode 18. In general, I prefer to choose condenser 16 of a relatively small capacity as compared with condenser 24 so that the incremental voltage placed on condenser 24 is small compared to the voltage applied to condenser 16. This causes successive increments of voltage on condenser 24 due to successive pulses from device 3 to be substantially equal.

The capacitor 24 is connected in the grid circuit of a pulse generator comprising the discharge device 20. The discharge device 20 has its anode 21 connected to a suitable source of positive unidirectional potential through a pulse transformer primary winding 28 shunted by a resistor 30. The cathode 22 of the discharge device 20 is connected to ground through a resistor 32 and to the source of positive unidirectional potential B+ 34 through a resistor 35 so that the cathode is biased positively with respect to ground. The resistor 32 is by-passed by a capacitor 33. The control electrode 23 is connected to ground through a transformer secondary winding 27, in series with the capacitor 24, the secondary winding being shunted by loading resistor 29 and being associated with primary winding 28 of the transformer. In operation, the capacitor 24 is charged positively by the output pulses from the blocking oscillator 1. Each pulse stores a predetermined incremental charge in the capacitor 24, but the cathode bias on the discharge device 20 is so adjusted, by adjustment of resistor 32, that five charging pulses to the capacitor 24 are required before the control electrode 23 is raised to a sufficiently positive potential with respect to the cathode to permit firing of the discharge device 20. Upon discharge of the device 20, regenerative coupling through the transformer windings 28 and 27 provides a sharp output pulse on anode 21 as shown on curve 37 of Fig. 1. During the discharge the control electrode 23 of device 20 draws current and the capacitor 24 loses its charge through the grid circuit comprising the resistors 29 and 32 so that upon termination of the discharge, which is hastened by regenerative action through the transformer windings 28 and 27, the charge on capacitor 24 is reduced to a potential below ground potential. The voltage appearing on the ungrounded plate of condenser 24 is indicated by the wave form 36, the charging pulses providing five positive steps, discharge taking place rapidly after the fifth step. The regenerative action causes discharge of capacitor 24 to below ground potential, but this negative charge is rapidly grounded by conduction through diodes 19 and 18 in series. Thus, the ÷5 counter 17 functions to supply at the anode 21 output pulses at the rate of one each fifty microseconds, that is, at ⅕ the repetition rate of the oscillator 1, the pulses being shaped as shown by wave form 37.

The output pulses from the counter 17 are supplied to a second impulse counter 40 of similar structure and having circuit constants arranged to supply one output pulse for each two positive input pulses, that is, the counter 40 is a ÷2 counter supplying, as its output, pulses at one-half the repetition rate of the output pulses from the counter 17. In the assumed example, the output pulses 41 from the counter 40 are spaced apart by 100 microseconds.

Following the counter 40 there are connected in series circuit relation four additional similar impulse counters 42, 44, 46, and 48. The counter 42 is a ÷5 counter supplying, as its output, impulses 43 spaced apart by 500 microseconds. The counter 44 is a ÷2 counter supplying, as its output, impulses 45 spaced apart by 1000 microseconds. The counter 46 is a ÷5 counter providing as its output, impulses 47 spaced apart by 5000 microseconds. Finally, the counter 48 is a ÷4 counter supplying, as its output, impulses 49 spaced apart by 20,000 microseconds.

Output pulses 49 from the counter 48 are supplied to a trigger circuit 50 which is adjusted to be tripped by every second impulse received from the counter 48 so that the output pulses 51 from the circuit 50 are at the rate of one every 40,000 microseconds. These output pulses from the circuit 50 serve as an arbitrary zero time from which delayed pulses are spaced by adjustable decade timing circuits to be described hereinafter. The trigger circuit 50 may suitably be of the well known Eccles-Jordan type comprising a triggered D.-C. cross-coupled multivibrator.

Output pulses 51 at the rate of one every 40,000 microseconds are supplied from the output of the trigger circuit 50 to a delay multivibrator 52 having circuit constants arranged selectably to provide output pulses variable between a duration of about 800 microseconds to about 15,000 microseconds. In practice, the multivibrator 52 is adjusted to provide output pulses having a duration of approximately 400 or 450 microseconds less than an integral number of thousands of microseconds between 1000 and 15,000 and, for this reason, has been identified on the drawing as the "thousand microsecond multivibrator."

The multivibrator 52 comprises a pair of electron discharge devices 53 and 54 having cathodes 55 and 56, respectively, connected together and to ground through a common cathode resistor 57. The anodes 58 and 59 of the discharge devices 53 and 54, respectively, are connected to the source of positive unidirectional potential B+ 34 through anode resistors 60 and 61, respectively. The control electrode 62 of the discharge device 54 is connected to B+ through a resistor 63 and to the anode 58 of the discharge device 53 through a capacitor 64. The control electrode 65 of the discharge device 53 is connected through a resistor 66 to a potentiometer slider 67 variable along a potentiometer 68 which is connected between B+ and ground. The control electrode 65 is also connected to the output of the trigger circuit 50 through a coupling capacitor 69.

To understand the operation of the delay multivibrator 52, let it be assumed that the discharge device 54 is carrying current and that the discharge device 53 is non-conductive. Under these circumstances, the cathode 55 is biased positively by the amount of voltage drop through the cathode resistor 57. Let it be assumed that the positive grid bias potential derived from the potentiometer 68 is less than the positive potential of the cathode 55 and that no signal is impressed upon the control electrode 65. Conduction through the discharge device 54 alone continues until disturbed by a positive synchronizing pulse from the coupling capacitor 69. The pulses produced by the trigger circuit 50 are shown diagrammatically in Fig. 2 on the curve 51, and the pulses applied to control electrode 65 through condenser 69 are shown on curve 70. When the positive going synchronizing pulse of curve 70 arrives, the control electrode 65 is suddenly driven positive with respect to the cathode 55 so that current flows in the discharge device 53. Since discharge device 53 is normally non-conductive, the negative going synchronizing pulses shown in curve 70 applied to the control electrode 65 have no effect. As soon as current flows in the device 53, as the result of a positive going pulse, the potential of the anode 58 decreases suddenly and impresses a negative potential upon the control electrode 62 of the discharge device 54 through the coupling capacitor 64. The negative potential thus impressed upon the control electrode 62 renders the discharge device 54 non-conductive. The constants of the circuit through the discharge device 53 are so chosen that the voltage drop through the common cathode resistor 57 when the device 53 is conducting is smaller than when the device 54 is conducting. Accordingly cathode 55 remains only slightly positive with respect to the control electrode 65 after passing of the synchronizing pulse, the potential difference being a function of the setting of arm 67 on potentiometer 68. Thus, the device 53 continues to conduct while the negative charge upon the capacitor 64 leaks off through the resistors 60 and 63. As soon as the potential of the control electrode 62 is raised by discharge of the capacitor 64 to such a point that the potential difference between the control electrode 62 and the cathode 56 is slightly less negative than the cutoff potential, the discharge device 54 again begins to conduct, causing the voltage drop through the resistor 57 to increase and drive cathode 55 of the discharge device 53 positive with respect to the control electrode 65 thereby to cut off the discharge of the discharge device 53, the exact time at which conduction in discharge device 54 occurs being dependent upon the potential of cathodes 55 and 56 as determined by the setting of arm 67 on potentiometer 68.

It will be understood from the foregoing explanation that the cycle time of the delay multivibrator 52 is the same as that of the trigger circuit 50 since its operation is controlled by the positive going synchronizing pulses derived from the trigger circuit at the rate of one positive going synchronizing pulse per cycle. Also, the period for which the discharge device 53 conducts following the arrival of each positive going synchronizing pulse through the coupling capacitor 69 is determined by the length of time taken for the capacitor 64 to discharge sufficiently to raise the grid potential of the discharge device 54 above cutoff. This time is determined not only by the constants of the discharge time of condenser 64 through resistors 60 and 63, but also by the extent to which the discharge device 54 is driven beyond cutoff by conduction of the discharge device 53. The intensity of the negative bias on the discharge device 54 is determined largely by the voltage drop through the cathode resistor 57 when the discharge device 53 is conducting. This voltage drop is in turn determined by the intensity of currents traversing the discharge device 53, as determined by the bias potential of its control electrode. Thus, it will be seen that the width or duration of a positive pulse derived from the anode 59 of the discharge device 54 is proportional to the bias potential applied to the control electrode 65 of the discharge device 53. As described hereinbefore, this bias potential is determined both by the setting of the potentiometer 68 and also by the signal potential applied through the coupling capacitor 69. The intensity of the synchronizing pulses is relatively fixed. The potentiometer 68, on the other hand, is so arranged that the width of the output pulses from the anode 59 may be adjusted from a minimum of less than 1000 microseconds to a maximum of about 15,000 microseconds or more.

Output pulses from the thousand multivibrator 52, shown on curve 71 of Fig. 2, are supplied to a differentiating circuit 82 comprising a capacitor 83 and a resistor 84. As is well understood by those skilled in the art, the differentiating circuit 82 provides across the resistor 84 a positive impulse at the leading edge of the multivibrator pulse and a negative impulse at the trailing edge of the multivibrator pulse, as shown on curve 72 of Fig. 2. Thus, the negative output impulse of the differentiating circuit is spaced from the leading edge of the multivibrator pulse, curve 71, by the width of the pulse which ordinarily is selected as approximately 400–450 microseconds less than an even number of thousands of microseconds. Since the leading edge of the delay multivibrator pulse occurs at the time of the synchronizing impulse from the trigger circuit 50, it will be evident that the negative output impulse from the differentiating circuit 82 is spaced from the output pulse of the trigger circuit 50 by approximately 400–450 microseconds less than an even number of thousands of microseconds, determined by the width of the thousands multivibrator output pulse, as shown by curves 51, 70, 71 and 72 of Fig. 2. The delay demonstrated on curves 71 and 72, as an example, is taken as 3600 microseconds.

The output impulses from the differentiating circuit 82 are supplied to a pedestal and clipping circuit 85. The pedestal generator of this circuit comprises a pair of electron discharge devices 86 and 87 having their cathodes 88 and 89, respectively, connected together to ground. The anodes 90 and 91 of the discharge devices 86 and 87, respectively, are connected together to the source of unidirectional positive potential B+ 34 through an anode resistor 92. The control electrode 93 of the discharge device 86 is connected to the high potential end of the differentiating resistor 84 through a coupling capacitor 94, and also to B+ through a resistor 99. The control electrode 95 of the discharge device 87 is connected to B+ through a resistor 96 and to the output of the ÷2 counter 44 through a coupling capacitor 97 and resistor 98 in series.

In operation, the pedestal and clipper circuit 85 functions in the following manner. Ordinarily, both discharge devices 86 and 87 are conducting because of the positive bias impressed on their control electrodes through the resistors 99 and 96 respectively. Negative portions of pulses 45 received from the counter 44 at intervals of 1000 microseconds reduce conduction in the discharge device 87 and thereby reduce the current in the common anode resistor 92. Accordingly, positive impulses of a predetermined intensity appear at the anode 91 at intervals of 1000 microseconds independently of the input from the differentiator 82. The positive half waves of the pulses 45 are absorbed by control electrode current in discharge device 87 providing a voltage drop in resistor 98 to make the positive half waves ineffective. When a negative impulse from the differentiator 82 is impressed through the capacitor 94 upon the control electrode 93 of the discharge device 86, conduction in the discharge device 86 is reduced, thereby to reduce the current through the common anode resistor 92 substantially independently of the action of the discharge device 87. These negative impulses impressed upon the control electrode 93 are of greater duration than the negative impulses received from the counter 44 and provide a pedestal utilized to distinguish desired impulses from the counter 44. The pedestal producing action may be understood from Fig. 2, wherein the negative pulses on curve 72 are shown clipped by dotted lines. These negative pulses correspond to that part of the output of differentiator 82 used to produce the pedestals. On curve 73 a pedestal is shown approximately centered in time corresponding to 4000 microseconds delay, curve 73 indicating the anode potential on interconnected anodes 90 and 91. Marker pulses applied in negative polarity to control electrode 95 of discharge device 87 serve to decrease conduction every 1000 microseconds in device 87, resulting in a brief increase of anode potential. The appearance of a marker impulse during the time of a pedestal generated by discharge device 86, will cause a brief increase of anode potential on anodes 90 and 91 to a potential considerably higher than that caused by the reduction of the discharge through one discharge device alone, since, for the brief interval, both of the discharge devices will be carrying a substantially reduced current. The effect is to lift one of the marker pulses to a higher potential than the others. Curve 73 of Fig. 2, for example, shows a marker impulse lifted on a pedestal 4000 microseconds after the leading edge of triggering impulses from trigger circuit 50. The pedestal may start after 3600 microseconds delay and continue to approximately 4400 microseconds, during which time only one marker impulse, at 4000 microseconds, will be received as shown on curve 73. By adjusting the position of slider 67 on potentiometer 68, the delay occurring before the start of the pedestal may be adjusted substantially continuously, so that a delay of 2000 microseconds may be obtained by adjusting the slider to produce a pedestal to start less than 2000 microseconds after the triggering impulse, such as 1600 microseconds thereafter. Then when a 1000 microsecond marker pulse is superimposed, the desired brief high potential pulse results. A delay of 8000 microseconds may be similarly provided by generating a pedestal delayed by approximately 7600 microseconds to lift a marker of 8000 microseconds delay. Whatever the delay period selected, a high potential pulse will be produced to follow each triggering pulse by the selected whole number of thousands of microseconds, the high potential pulses thereafter recurring every 40,000 microseconds.

The lifted high potential pulses produced on anodes 90 and 91 are furnished to a second multivibrator and differentiator 100, of a type similar to multivibrator 52 and differentiator 82, to trigger the circuit thereof. The circuit components of multivibrator and differentiator 100 are, however, adjusted to provide square pulse, curve 74 of Fig. 2, with a duration of approximately 40–45 microseconds less than a whole multiple of hundreds of microseconds, and thereby develop a negative impulse from the differentiator which may be applied to pedestal and clipper circuit 101 to produce a pedestal, the start of which is delayed 40–45 microseconds less than a whole multiple of hundreds of microseconds after the triggering pulse furnished from pedestal and clipper circuit 85. Pulses recurring every hundred microseconds are received from counter 40 through resistor 102 which, in the manner already described, provide a brief high potential pulse, shown on curves 75 and 76 of Fig. 2 as occurring 400 microseconds after the output pulse from pedestal and clipper circuit 85. As already explained, the pulse from pedestal and clipper circuit 85 is delayed in the example used, by 4000 microseconds from the original triggering pulse from the trigger circuit 50. The output pulse from pedestal and clipper circuit 101 is accordingly delayed by 4400 microseconds from the original triggering pulse. The output of pedestal and clipper circuit 101 is applied to trigger a third multivibrator and differentiator 103, which is connected to a pedestal and clipper circuit 104 receiving 10 microsecond marker pulses from blocking oscillator 1 to produce an output delayed by a whole number of tens of microseconds as shown on curves 77, 78 and 79 of Fig. 2, after the triggering pulse from pedestal and clipper circuit 101. The total delay of the output pulse from pedestal and clipper circuit 104 is accordingly the sum of the three delays, 4000, 400 and 40 microseconds, after the original triggering pulses. A fourth multivibrator and differentiator 105 is arranged for triggering from pedestal and clipper circuit 104 to develop a pulse, curve 80, which, when differentiated, provides a final negative pulse, curve 81 of Fig. 2, further delayed by a number of unit microseconds, and fractions thereof, as determined by the setting of the multivibrator potentiometer as in the circuit of multivibrator 52. In the system shown in Fig. 1, the final delay is approximate, not being accurately controlled by marker pulses. It will be apparent to those skilled in the art that additional circuits may be provided, however, to provide a total delay accurately controlled to smaller units of time if required. The total delay from each triggering impulse of trigger circuit 50 as measured to the negative pulse of the output of multivibrator and differentiator 105, in the example shown as 4444 microseconds. The accuracy is determined primarily by the stability of crystal oscillator 2. It will be obvious that any desired delay is readily obtainable, other than 4444 microseconds used for illustration, between 1110 microseconds and approximately 15000 microseconds or more, in steps of a small fraction of a microsecond.

While a specific embodiment of the invention has been shown and described, I do not desire to be limited except in accordance with the following claims.

What I claim as new and desire to secure by Letters Patent of the United States is:

1. In a time delay system, means for producing a trigger pulse comprising an oscillator connected to excite a cascade of frequency dividing means operative at progressively lower frequencies, means connected to receive signals of a relatively high frequency from one of said frequency dividing means in said cascade and responsive to said trigger pulse for producing a second pulse delayed from said triggering pulse by a predetermined number of relatively high frequency pulse periods, and means connected to receive said second pulse and signals of a relatively low frequency from another dividing means in said cascade for producing a third pulse delayed from said second pulse by a predetermined number of relatively low frequency pulse periods.

2. In a time delay system, an oscillator and a plurality of frequency dividing circuits excited therefrom adapted to produce a recurring triggering pulse, a multivibrator connected for triggering by said pulse to produce a second pulse of predetermined adjustable duration, a differentiator connected to receive said second pulse and adapted to provide an initiating pulse at the termination of said multivibrator pulse, a pedestal forming device connected to receive signals from one of said frequency dividing circuits and said initiating pulse, means responsive to said initiating pulse for generating a pedestal pulse, said pedestal forming device responsive only to time coincidence of a signal from one of said frequency dividing circuits and said generated pedestal pulse for adding said signal and said generated pedestal pulse.

3. In a device for producing a delayed second pulse a predetermined time after a primary triggering pulse, an oscillator, means excited by said oscillator for forming a series of recurring pulses at a predetermined repetition rate, a multivibrator adapted for triggering by said primary pulse to produce an intermediate pulse of predetermined duration, means connected to the output of said multivibrator and connected to receive said series of pulses from said pulse forming means for producing said second pulse upon reception of one pulse of said series within a predetermined time interval after the termination of said intermediate pulse.

4. In a pulse timing system, means for producing a series of recurring pulses at a predetermined repetition rate, means adapted to receive a triggering pulse and to produce a secondary pulse of predetermined duration in response to said triggering pulse, means responsive to the termination of said secondary pulse to produce a pedestal voltage at the termination of said secondary pulse, the duration of said pedestal voltage being substantially equal to the period of said recurring pulses, and means connected to said first mentioned means and responsive to said pedestal voltage to produce a third pulse formed from and equal in magnitude to the arithmetic sum of the voltage of one of said recurring pulses and said pedestal voltage.

5. In a pulse timing system comprising means for producing a plurality of series of pulses at a plurality of interrelated substantially constant repetition rates, a pulse source, first and second pulse generating means, means for applying a pulse from said source to said first pulse generating means, said first pulse generating means being arranged to generate a pulse of predetermined duration a finite time interval after application of said pulse, and means responsive to time coincidence of said generated pulse and a pulse within one of said series of pulses to form an output pulse, said second pulse generating means responsive to said output pulse for generating a delayed pulse of given duration a finite time interval after application of said output pulse, and means responsive to time coincidence of said delayed pulse and a pulse within one of the other of said series of pulses to form an output pulse.

6. A timing arrangement comprising a source of periodic marker pulses, said pulses having a width substantially less than the pulse period, a plurality of pulse frequency dividing means, means for connecting said dividing means in cascade, means for applying said marker pulses to the input of the lead dividing means in said cascade to provide a train of trigger pulses at the output of the final dividing means and secondary trains of pulses at the outputs of preceding dividing means, the periodicity of each of said secondary pulse trains bearing a different lower subharmonic relationship with the periodicity of said applied pulses, a plurality of processing means, each of said processing means comprising means responsive to an applied pulse for generating a pedestal pulse of given duration occurring an adjustable finite time interval after application of said pulse, and a plurality of combining means each responsive to time coincidence of a respective generated pedestal pulse and a pulse within a respective one of said secondary trains of pulses to generate an output pulse, means for connecting each of said processing means in cascade, means for applying said triggering pulses to the lead pedestal pulse generating means in said cascade, means for applying the output pulse of each combining means to a succeeding pedestal pulse generating means as said applied pulse, and an output circuit connected to the final combining means in said cascade.

7. An arrangement comprising a source of periodic marker pulses, said pulses having a width substantially less than the pulse period, a plurality of pulse frequency dividing means, means for connecting said dividing means in cascade, means for applying said marker pulses to the input of the lead dividing means in said cascade to deliver a train of trigger pulses at the output of the final dividing means and secondary trains of pulses at the outputs of preceding dividing means, each of said secondary trains of pulses having a pulse periodicity bearing a different lower subharmonic relationship with the periodicity of said applied marker pulses, means responsive to an applied triggering pulse for generating a pedestal pulse of given duration occurring at adjustable finite time intervals after application of said triggering pulse, combining means responsive to time coincidence of said generated pedestal pulse and a pulse selected from one of said delivered secondary trains of pulses for generating an output pulse, said given duration being less than the period of said one secondary train of pulses such that coincidence can occur for only one pedestal and one selected pulse.

8. An arrangement comprising a source of periodic marker pulses, said pulses having a width substantially less than the pulse period, a plurality of means each responsive to said marker pulses for providing a secondary train of pulses, each of said secondary trains of pulses having a periodicity bearing a different plural integral submultiple relationship with the periodicity of said marker pulses and being harmonically related, means timed with the periodicity of said marker pulses for generating trigger pulses having a lower periodicity than any of said aforementioned pulses, means timed with the periodicity of said triggering pulses for generating a plurality of pedestal pulses occurring in non-overlapping time periods within the period of said triggering pulses, means for adjusting the time occurrence of said pedestal pulses over given non-overlapping ranges, individual means responsive to time coincidence of a respective one of said pedestal pulses and a pulse within a respective one of said secondary trains of pulses for generating an output pulse, and means for combining said output pulses.

9. An arrangement comprising a source of periodic marker pulses, said pulses having a width substantially less than the pulse period, means responsive to said marker pulses for generating a plurality of secondary trains of pulses of plurally, harmonically related periodicity lower than said marker pulses, means timed with the periodicity of said marker pulses for generating trigger pulses having a periodicity lower than that of any of said aformentioned pulses, means timed with the periodicity of said trigger pulses for generating a plurality of successively occurring pedestal pulses, one for each secondary pulse train period, individual means responsive to time coincidence of each of said pedestal pulses and a pulse within a respective secondary train of pulses for generating an output pulse, the width of said pedestal pulses being substantially less than the period of the respective secondary trains of pulses to permit time coincidence of only one pulse of a secondary train of pulses and a respective pedestal pulse, and means for adjusting the time occurrence of each of said pedestal pulses to select one of the pulses from a respective secondary pulse train.

10. An arrangement comprising a source of periodic marker pulses having a width substantially less than the pulse period, means responsive to said marker pulses for providing a first and second train of pulses, said first and second trains of pulses having a periodicity bearing a different plural integral submultiple relationship with the periodicity of said marker pulses, said second pulse train having the lowest periodicity, means responsive to said second train of pulses for generating pedestal pulses of given duration occurring at adjustable finite time intervals after said second pulses, a combining means responsive to time coincidence of a respective applied pedestal pulse and a selected pulse within said second train of pulses for generating an output pulse, said given duration being less than the pulse period of said second pulse train such that coincidence can occur for only one pedestal and one selected pulse, and means for adjusting the time interval of occurrence of said pedestal pulses within the periods of said second pulse train.

ALFRED F. BISCHOFF.

REFERENCES CITED

The following references are of record in the file of this patent:

UNITED STATES PATENTS

| Number | Name | Date |
|---|---|---|
| 2,258,943 | Bedford | Oct. 14, 1941 |
| 2,375,950 | Schlesinger | May 15, 1945 |
| 2,403,873 | Mumma | July 9, 1946 |
| 2,405,238 | Seeley | Aug. 6, 1946 |
| 2,411,648 | Brauer et al. | Nov. 26, 1946 |
| 2,420,516 | Bischoff | May 13, 1947 |
| 2,432,158 | Hulst | Dec. 9, 1947 |